April 5, 1966     H. N. BRAUNHUT     3,244,145
AQUARIUM ASSEMBLY
Filed July 22, 1964     2 Sheets-Sheet 1
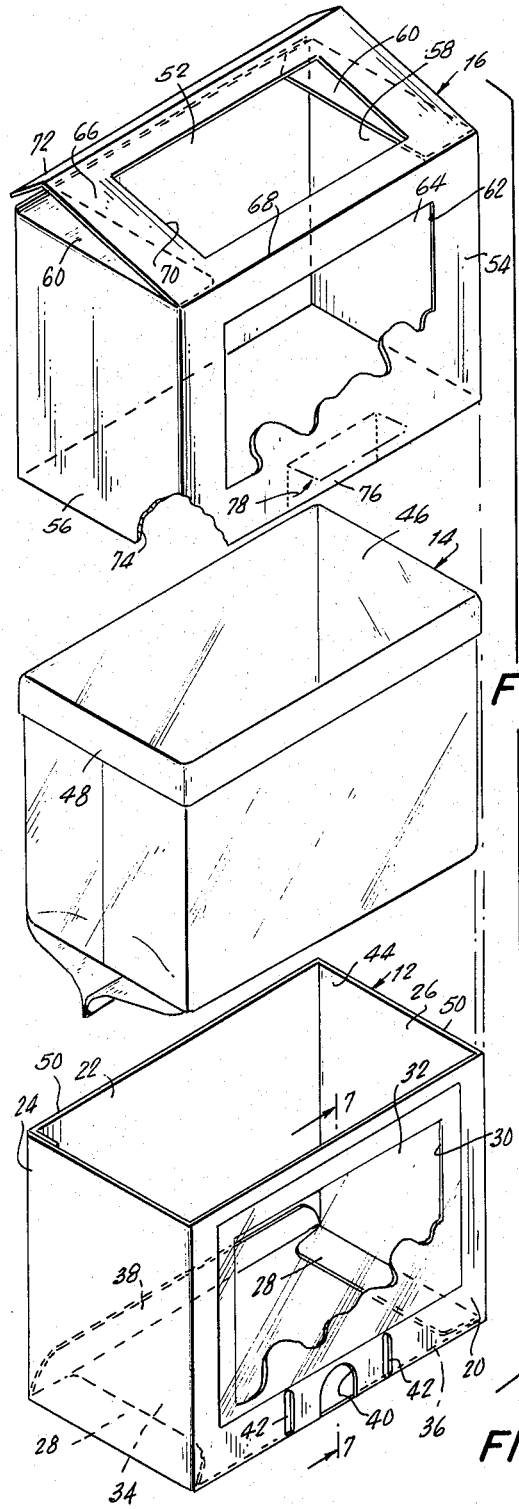
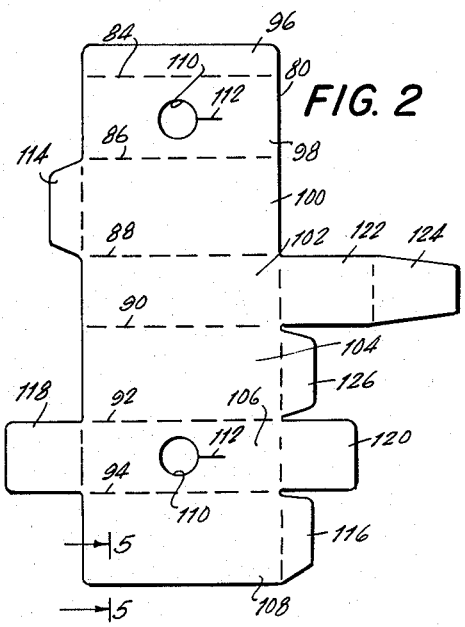
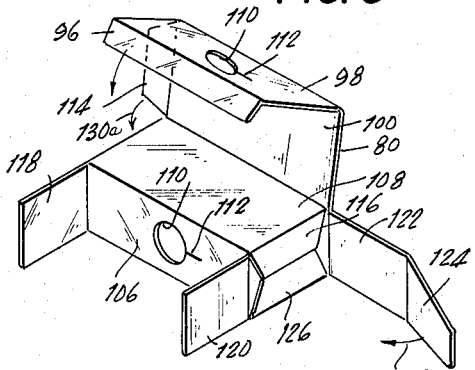
INVENTOR.
HAROLD N. BRAUNHUT
BY
Friedman & Goodman
ATTORNEYS April 5, 1966 H. N. BRAUNHUT 3,244,145
AQUARIUM ASSEMBLY
Filed July 22, 1964 2 Sheets-Sheet 2

INVENTOR.
HAROLD N. BRAUNHUT
BY
ATTORNEYS

United States Patent Office 3,244,145
Patented Apr. 5, 1966

3,244,145
AQUARIUM ASSEMBLY
Harold N. Braunhut, 1812 Atlantic Ave., Brooklyn, N.Y.
Filed July 22, 1964, Ser. No. 384,335
6 Claims. (Cl. 119—5)

The present invention relates to an aquarium.

It is the object of the present invention to provide an aquarium formed of paperboard or the like which can be manufactured and sold at a relatively low price.

It is another object of the present invention to provide an aquarium which can be sold in disassembled relation and which is very simple to assemble, which assembly can be accomplished even by a child and without the necessity of utilizing any special tools or materials.

It is a further object of the present invention to provide an aquarium which is highly suitable for use by a child which can be simply assembled by the child and which will provide highly advantageous educational and play benefits.

Other and further objects and advantages of the present invention will be readily apparent to one skilled in the art from a consideration of the following specification taken in connection with the appended drawings.

In the drawings which illustrate the best mode presently contemplated for carrying out the invention:

FIGURE 1 is an exploded view of an aquarium pursuant to the present invention;

FIGURE 2 is a plan view of a blank from which a light housing for the aquarium is to be formed;

FIGURE 3 is a perspective view of the light housing during an intermediate step in the formation thereof;

FIGURE 4 is a perspective view of the fully completed light housing;

FIGURE 5 is a sectional view taken on the line 5—5 of FIGURE 2;

Figure 9:
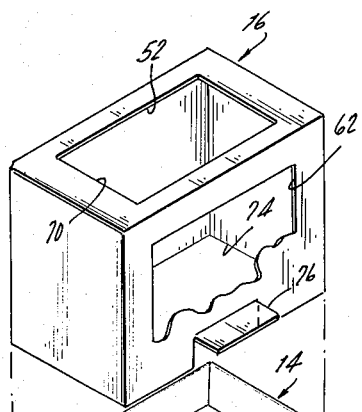
FIGURE 9 is an exploded view of the aquarium and illustrates the light housing assembly mounted in position thereon.
Figure 10:
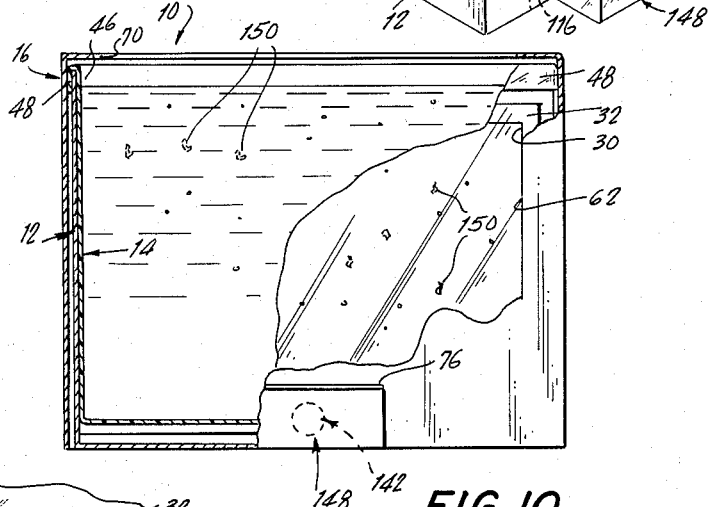
FIGURE 10 is a side view of the aquarium in assembled relation with portions thereof being removed and broken away for purposes of illustration.
Figure 8:
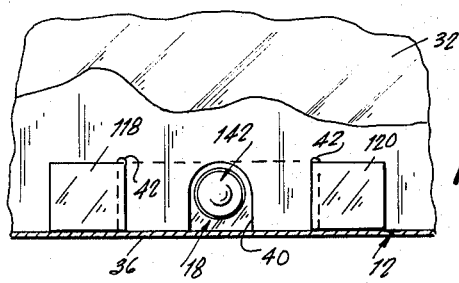
FIGURE 8 is a sectional view on an enlarged scale taken on the line 8—8 of FIGURE 7.

Referring now to the drawings in detail, there is illustrated in FIGURE 10 an aquarium assembly 10 which is formed from the disassembled parts and in the manner illustrated in FIGURES 1 through 9. As here shown, the aquarium assembly 10 comprises a tank member 12, a tank liner 14, a tank housing 16 and a light housing 18.

The aquarium tank 12 is preferably formed of paperboard or cardboard or other similar suitable material. As here shown, the tank 12 is essentially of rectangular configuration and is provided with the opposing side walls 20 and 22 and the opposing end walls 24 and 26. The end walls 24 and 26 are each provided with a bendable flap 28. The side wall 20 is provided with a cut out 30 which is covered preferably by a sheet of transparent film 32 so as to provide a window through which the interior of the tank 12 is visible. It will be apparent that cut outs similar to cut out 30 may additionally be provided in one or more of the other walls and when similarly covered will provide additional windows. The tank is provided also with a bottom wall 34 which is hinged to the side wall 20 along the hinge line 36. The bottom wall 34 is provided also with a closure flap 38. It will be understood that the tank 12 is originally provided in knocked down or collapsed condition and may be readily assembled by merely spreading the walls apart, folding the flaps 28 inwardly and then folding the bottom wall 34 inwardly so as to underlie the flaps 28 and then inserting the closure flap 38 so as to abut the inner surface of the side wall 22. The side wall 20 is provided also, below the window 32 with a substantially central cut out 40 and with an elongated slot 42 at either side of the cut out. The function of the cut out 40 and the slots 42 will be hereinafter described.

It will be noted that the tank 12 is open at the top thereof as indicated by the reference numeral 44. The aforementioned liner 14 is insertable into the tank 12 through the open top 44 thereof. The liner 14 preferably is formed from suitable transparent water impervious sheet material, preferably a suitable plastic film, which is in the form of a bag having a top or upper opening 46. The bag 14 is inserted into the tank 12 through the top opening 44 in the tank and is then disposed therein as best illustrated in FIGURE 10. When the liner 14 is disposed within the tank 12, the liner is bent back along the top opening 46 thereof so as to define a peripheral cuff 48 which overlies the upper peripheral edges 50 of the tank 12 as best known in FIGURE 10.

The aquarium housing 16 is formed of the same material of which the tank 12 is formed. The housing 16 is also of retangular or box like conformation as in the case of the tank 12. The housing 16 is provided with the opposing side walls 52 and 54 and opposing end walls 56 and 58. The end walls 56 and 58 are each provided with a bendable flap 60. The side wall 54 is provided with a cut out 62 which is covered with a transparent film or window 64. The housing 16 is provided also with a top wall or cover 66 which is hinged to the side wall 54 along the hinge line 68. The cover 66 is provided with a central cut out or opening 70 and with a bendable closure flap 72. In order to close the upper end of the housing 16, the end wall flaps 60 are first bent inwardly and then the cover 66 is folded downwardly to overlie the end flaps and the closure flap 72 on the cover is inserted so as to abut the inner surface of the side wall 52. It will be noted that the housing 16 is open at the bottom thereof as indicated by the reference numeral 74. Due to the fact that the housing 16 is provided with a bottom opening 74 the housing 16 may be superimposed and seated on the assembled tank and lining as indicated in FIGURES 9 and 10. The housing side wall 54 is provided also with a central bendable flap 76 which is bendable from the full line position thereof indicated in FIGURE 1 to the broken line position thereof by movement in the direction of the arrow 78.

Figure 6:
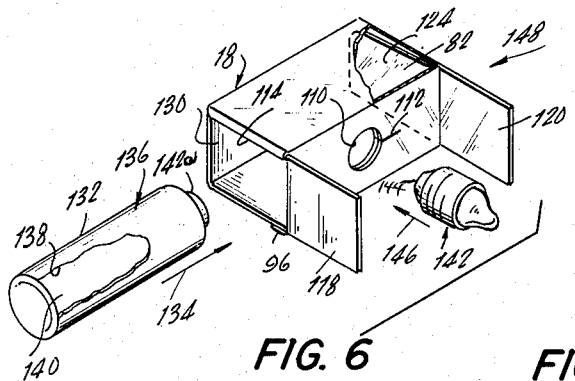
FIGURE 6 is an exploded view of the light housing assembly and illustrates the battery and light bulb utilized therewith.

As best illustrated in FIGURES 2, 3 and 4, the light housing 18 is formed from a blank 80 of cardboard or paperboard or similar material which is provided only on its outer surface with a metallic or conductive film or coating 82 as best shown in FIGURE 5. As here shown, the blank 80 is provided with the transversely extending fold lines 84, 86, 88, 90, 92 and 94 which define a flap 96 and the wall segments 98, 100, 102, 104, 106 and 108. The wall segments 98 and 106 are each provided with a circular cut out 110 from which there extends a slit 112. The segments 100 and 108 are provided with the opposing flaps 114 and 116 respectively. The segment 106 is provided with the opposing end flaps 118 and 120 and the segment 102 is provided with an end flap 122, having a bendable extension 124. The segment 104 is provided also with an end flap 126. The segments, as best shown in FIGURE 3 are folded along the various fold lines to define a box constituted by the opposing side walls 104 and 108 and the opposing end walls 102 and 106. The box is closed at one end by the flaps 116 and 120. The flaps 118 and 120 project from the box. The segments 98 and 100 then are bent downwardly so that the segment 100 overlies the segment 108 and the segment 98 overlies the segment 106 with the apertures 110 and the slits 112 in registry. The end flap 122 is folded inwardly as indicated by the arrow 128 and the flap extension 124 is tucked in to underlie the inner surface of the end wall 106. The end flap 114 is bent inwardly as indicated by the arrow 130a to underlie and abut the inner surface of the wall segment 108 so as to retain the light housing in the position thereof illustrated in the FIGURE 4 in which the end flap 96 overlies the outer surface of the wall segment 104. It will be noted that the metallic coating 82 is on the exterior surface of the light housing 18. When so assembled, and as best indicated in FIGURE 6, the light housing 18 has an end opening 130, the other end of which is closed by the end flap 124 and it will be noted that the metallic coated surface 82 of the end flap 124 is disposed within the light housing 18 in opposition to the opening 130 thereof.

Figure 7:
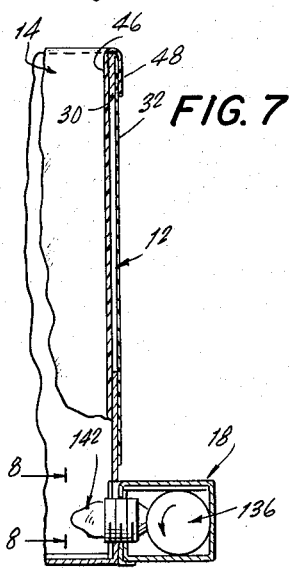
FIGURE 7 is a sectional view on the line 7—7 of FIGURE 1.

A penlight or flashlight battery 132 is insertable into the light housing 18 through the opening 130 thereof as indicated by the arrow 134. Before the battery is inserted, a portion of the protective covering 136 thereof is removed as indicated 138 so as to expose the underlying metallic casing 140 of the battery. The battery is inserted with its electrode 142a foremost so that the electrode 142 will make contact with the metallic coating 82 on the flap 124 and the battery casing 140 will be exposed at the apertures 110. A flashlight bulb 142 provided with a conventional electrode 144 is inserted into the openings 110 as indicated by the arrow 146 so that the electrode 144 will engage the casing 140 to energize the light bulb 142. It will be understood that when disposed within the light housing 18, the battery 136 and the light bulb 142 define therewith a light assembly generally indicated by the reference numeral 148. The light assembly is shown mounted in position on the aquarium as shown in FIGURE 7. In order to mount the light assembly 148 on to the aquarium assembly 10, the flap 76 on the tank housing 16 is raised to the broken line position thereof shown in FIGURE 1 so as to expose the cut out 40 and the slots 42 in the tank 12. The flaps 118 and 120 on the light housing 18 are then inserted into the slots 42 and the light bulb 142 is inserted into the cut out 40 as shown in FIGURE 7. The flaps 118 and 120 are then bent back to the position thereof shown in FIGURE 9 so as to securely lock the light assembly in position on the aquarium assembly.

With the aquarium so assembled, it will be readily apparent that an appropriate amount of water may be inserted into the lining 14 and any suitable marine life may be inserted into the water. The water is open to the air through the top opening 70 in the upper cover or wall 66 of the tank housing 16 through which food or other supplies may be inserted into the water. The contents of the aquarium may be readily observed through the cut out 62 in the tank housing which is in registry with the window 32 provided in the tank 12. Moreover, the contents of the aquarium will be illuminated by the light bulb 142 which abuts the liner or lining 14 as best shown in FIGURE 7. Marine life within the aquarium is generally indicated by the reference numeral 150 in FIGURE 10. It will be noted that the battery 136 extends from the light housing 18 so that the end thereof opposite the electrode 142a may be readily grasped in the finger. In this manner, the battery may be rotated as indicated by the arrow 152 in FIGURE 7 so as to bring the bulb electrode 144 into and out of electrical contact with the exposed portion 140 of the battery casing whereby to turn the light bulb on and off, the rotation of the battery in this manner operating as a switch.

In view of the foregoing, it will be apparent that there has been illustrated and described a highly novel aquarium assembly which may be readily and simply erected even by a child without the necessity of utilizing any tools and which can well serve as a highly novel educational device as well as a suitable plaything or toy.

I have here shown and described a preferred embodiment of my invention. It will be apparent, however, that this invention is not limited to this embodiment, and that many changes, additions and modifications can be made in connection therewith without departing from the spirit and scope of the invention as herein disclosed and hereafter claimed.

I claim:

1. An aquarium assembly comprising a tank formed of sheet material, a transparent water-impervious liner formed of sheet material and mounted in said tank, and a window defined in said tank through which said liner is visible, and a light housing mounted by said tank below said window, said light housing being formed of paper board which is provided on one surface thereof with an electricity conductive coat, said light housing defining an enclosure for mounting a battery in electrical contact with said conductive coat, said light housing also having defined therein a socket for mounting a light bulb in electrical contact with both the battery and said conductive coat.

2. An aquarium assembly comprising a tank formed of sheet material, a transparent water-impervious liner formed of sheet material and mounted in said tank, and a window defined in said tank through which said liner is visible, and a light housing mounted by said tank below said window, said light housing being formed of paper board which is provided on one surface thereof with an electricity conductive coat, said light housing defining an enclosure for mounting a battery in electrical contact with said conductive coat, said light housing also having defined therein a socket for mounting a light bulb in electrical contact with both the battery and said conductive coat, said light housing having flap mounting means and said tank having slot means defined therein for the reception of said flap mounting means.

3. An aquarium assembly comprising a tank formed of sheet material, a transparent water-impervious liner formed of sheet material and mounted in said tank, and a window defined in said tank through which said liner is visible, and a light housing mounted by said tank below said window, said light housing being formed of paper board which is provided on one surface thereof with an electricity conductive coat, said light housing defining an enclosure for mounting a battery in electrical contact with said conductive coat, said light housing also having defined therein a socket for mounting a light bulb in electrical contact with both the battery and said conductive coat, said light housing having flap mounting means and said tank having slot means defined therein for the reception of said flap mounting means, and said tank having an opening defined therein, said socket being in registry with said opening whereby the light bulb mounted in said socket will project into said tank.

4. An aquarium assembly comprising a tank formed of sheet material, a transparent water-impervious liner formed of sheet material and mounted in said tank, and a window defined in said tank through which said liner is visible, and a housing in which said tank is disposed, said housing being formed of sheet material, and a window defined in said housing in registry with said tank window, and a light housing mounted by said tank below said window, said tank housing having a flap defined therein for exposing a portion of said tank on which said light housing is mounted, said light housing being formed of paper board which is provided on one surface thereof with an electrically conductive coat, said light housing defining an enclosure for mounting a battery in electrical contact with said conductice coat, said light housing also having defined therein a socket for mounting a light bulb in electrical contact with both the battery and said conductive coat.

5. An aquarium assembly comprising a tank formed of sheet material, a transparent water-impervious liner formed of sheet material and mounted in said tank, and a window defined in said tank through which said liner is visible, and a housing in which said tank is disposed, said housing being formed of sheet material, and a window defined in said housing in registry with said tank window, and a light housing mounted by said tank below said window, said tank housing having a flap defined therein for exposing a portion of said tank on which said light housing is mounted, said light housing being formed of paper board which is provided on one surface thereof with an electrically conductive coat, said light housing defining an enclosure for mounting a battery in electrical contact with said conductive coat, said light housing also having defined therein a socket for mounting a light bulb in electrical contact with both the battery and said conductive coat, said exposed portion of said tank having means defined therein for mounting said light housing thereon.

6. An aquarium assembly comprising a tank formed of sheet material, a transparent water-impervious liner formed of sheet material and mounted in said tank, and a window defined in said tank through which said liner is visible, and a housing in which said tank is disposed, said housing being formed of sheet material, and a window defined in said housing in registry with said tank window, and a light housing mounted by said tank below said window, said tank housing having a flap defined therein for exposing a portion of said tank on which said light housing is mounted, said light housing being formed of paperboard which is provided on one surface thereof with an electrically conductive coat, said light housing defining an enclosure for mounting a battery in electrical contact with said conductive coat, said light housing also having defined therein a socket for mounting a light bulb in electrical contact with both the battery and said conductive coat, said exposed portion of said tank having means defined therein for mounting said light housing thereon, and said exposed portion having an opening defined therein, said socket being in registry with said opening whereby the light bulb mounted in said socket will project into said tank.

References Cited by the Examiner

UNITED STATES PATENTS

| 2,149,412 | 3/1939 | Bangs | 119—50 X |
| 2,763,239 | 9/1956 | Rendall | 119—5 |
| 3,122,127 | 2/1964 | Schechmeister et al. | 119—18 |

FOREIGN PATENTS 660,048  10/1951  Great Britain.

SAMUEL KOREN, *Primary Examiner.*

HUGH R. CHAMBLEE, *Examiner.*